з,470,302
Patented Sept. 30, 1969

3,470,302
PROCESS OF FUMIGATION WITH FLUORO-
CYCLOALKENE FLUOROALKYL ETHERS
Robert E. A. Dear and Everett E. Gilbert, Morristown,
N.J., assignors to Allied Chemical Corporation, New
York, N.Y., a corporation of New York
No Drawing. Filed Oct. 12, 1967, Ser. No. 674,768
Int. Cl. A01n 9/24
U.S. Cl. 424—339                                7 Claims

ABSTRACT OF THE DISCLOSURE

Process for combating noxious insects by fumigation which comprises subjecting said insects to the action of vapors of fluorocycloalkene fluoroalkyl monoethers.

---

This invention relates to a process for combating noxious insects by fumigation.

Many insects and mite pests which infest areas and confined spaces which are difficult to reach or control by direct application of liquid or solid insecticides are readily controlled by exposure to toxic gases or vapors known as fumigants. Fumigation methods are especially valuable in controlling pests in greenhouses, homes, warehouses and the like, and are especially effective in ridding stored grain of destructive pests.

We have now found that the fluoroalkyl monoethers of perfluorocycloalkenes of the formulas

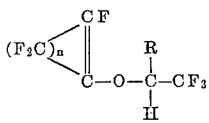

and

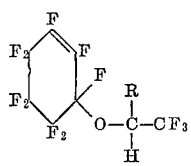

wherein R is hydrogen or trifluoromethyl; n is 2 or 4, and which include the isomeric fluorocyclohexene fluoroalkyl ethers and the fluorocyclobutene fluoroalkyl ethers shown below

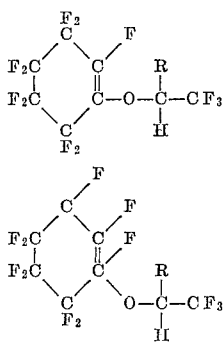

and

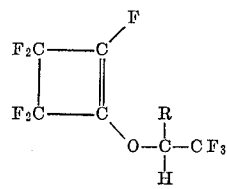

wherein R is as defined above, are especially effective in destroying or controlling a wide variety of insect pests including termites and numerous grain infesting pests. Thus we have found the fluorocycloalkene fluoroalkyl-ethers of our invention to be effective fumigants in combating termites, especially Eastern Subterranean termites, *Reticulitermes flavipes*; confused flour beetles, *Tribolium confusum*; lesser meal worms, *Alphitobius diaperinus*; black carpet beetles, *Attagenus piceus*; yellow meal worms, *Tenebrio molitar*; sawtooth grain beetle; *Oryzaephilus surinamensis*; the common housefly, *Musca domestica*, and the like.

Whenever the term "insects" is used in the instant specification and claims, it is to be understood as referring to the insects in adult, pupal, nymphal, larval or egg stages.

The perfluorocyclohexene monofluoroalkyl ethers are known compounds, disclosed by Clayton et al., J. Chem. Soc. (1965), p. 7359. The perflorocyclobutene mono-fluoroalkyl ethers are disclosed and claimed per se in our copending application Ser. No. 674,746, filed as of even date herewith (G.C. 1449, P.D. 5300-1192).

The above compounds are colorless liquids boiling in the range between about 80° C. and about 120° C.

The perfluorocycloalkene mono-fluoroalkyl ethers used herein can be prepared by the addition of trifluoroethanol or hexafluoroisopropanol to the appropriate perfluoro-cycloalkene in the presence of potassium hydroxide, according to the scheme

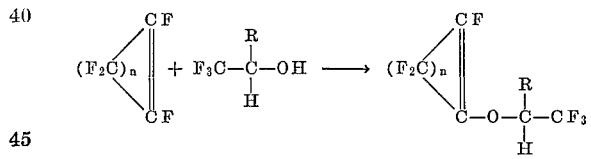

wherein R represents hydrogen or trifluoromethyl, n is 2 or 4. The isomeric cyclohexene compound is formed as a by-product when the starting cycloalkene is the indicated perfluorocyclohexene.

Fumigation with the perfluorocycloalkene mono-fluoroalkyl ethers as practiced according to our invention is carried out according to conventional fumigation practices by exposing the organism to the vapor of the perfluoro-cycloalkene mono-fluoroalkyl ether. This is usually accomplished by placing a small amount of the liquid toxicant in the space to be fumigated, or injecting relatively small amounts into the body of the material to be treated such as grain, soil or the like, and permitting the toxicant to vaporize, thus subjecting the organism to be controlled to the vapors of the toxicant for a period sufficient to rid the space of the pests. Alternatively, if desired, the toxicant may be initially applied in vapor form. In general a vapor concentration in the space to be treated of about one pound of toxicant per 1,000 cubic feet of space is usually sufficient.

The following specific examples further illustrate our invention. Parts are by weight except as otherwise noted.

EXAMPLE 1

Perfluorocyclohexene (52.4 g., 0.2 mole) was placed in a 250 ml. three-necked flask and 2,2,2-trifluoroethanol (20 g., 0.2 mole) was added. No reaction occurred in the absence of potassium hydroxide. 11.2 g. (0.2 mole) of potassium hydroxide was dissolved in 40 g. (0.4 mole) trifluoroethanol and the solution was added to the reaction mixture. The temperature in the flask rose during the addition to 35° and gradually declined over a 3 hour period to 22°. The mixture was stirred under a blanket of nitrogen overnight, then poured into 75 ml. water. The lower layer was separated and dried. Distillation gave a forerun of 8.9 g. of recovered olefin, a fraction (1) boiling at 115–119°. Gas liquid chromatography showed that fraction (1) contained three components, namely the two unsaturated fluoroisomers, 2-(2,2,2-trifluoroethoxy)-nonafluorocyclohexene-1, and 3-(2,2,2-trifluoroethoxy)-nonafluorocyclohexene-1, of the formulas

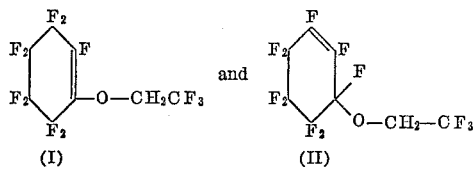

together with a small amount of 1-(2,2,2-trifluoroethoxy)-2-hydrodecafluorocyclohexane of the formula

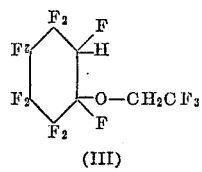

The latter Compound III was removed by refluxing with aqueous potassium hydroxide solution. Upon redistillation of the purified first fraction, there was obtained 36.5 grams of a mixture boiling between 117° and 118° C. Gas liquid chromatography and infrared analysis showed it to consist of a mixture of the two isomers I and II whose structures are shown above, in the approximate proportions of 63% of I and 37% of II.

Elemental analysis showed. Calc.: C, 28.09; H, 0.59. Found: C, 28.17; H, 0.53.

A portion of the above mixture of isomers I and II were subjected to gas chromatographic separation and produced the indicated proportions of 2-(2,2,2-trifluoroethoxy)-nonafluorocyclohexene-1 (Compound I) and 3-(2,2,2 - trifluoroethoxy) - nonafluorocyclohexene-1 (Compound II) which were identified by their infrared spectrograms; Compound I showing characteristic absorption peaks at a frequency 1718 cm.⁻¹ typical of monofluorinated double bond

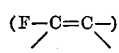

and Compound II showing characteristic absorption peaks at a frequency 1742 cm.⁻¹ indicative of a 1,2-difluorinated double bond

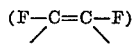

EXAMPLE 2

A solution of potassium hydroxide (20 g., 0.3 mole based on 85% purity) was prepared in 100 g. of 2,2,2-trifluoroethanol. The solution was charged to a 300 ml. stainless steel autoclave which was then sealed, cooled and evacuated. Perfluorocyclobutene (51 g., 0.314 mole) was introduced and after warming, the autoclave was allowed to remain at room temperature overnight. A pressure of 30 p.s.i.g. developed and then rapidly decreased either as reaction occurred or as the olefin dissolved in the alcohol. After 16 hours the autoclave was opened and the contents poured into a separatory funnel and washed with 250 ml. water. The lower organic layer was separated and distilled. The distillate still contained some trifluoroethanol so the entire product was washed with potassium hydroxide solution, dried and redistilled. There was obtained 62.2 g. of mono ether boiling at 95° C. The structure of both examples was examined by gas-liquid chromatography and infrared analysis. The mono ether was the single isomer 2-(2,2,2-trifluoroethoxy)-pentafluoro butene-1 of the formula

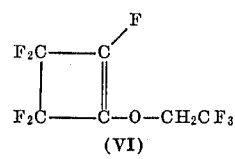

Elemental analyses showed. Calc.: monoether (VI) C, 29.75; H, 0.83. Found: monoether (VI) C, 29.99; H, 0.92.

EXAMPLE 3

A solution of potassium hydroxide (20 g., 0.3 mole) was prepared in 120 ml., 175 g. (1.04 moles) of hexafluoroisopropanol. The solution was charged to a 300 ml. stainless steel autoclave which was sealed, cooled and evacuated. Perfluorocyclobutene (45 g., 0.278 mole) was introduced, and after warming, the autoclave was allowed to remain at room temperature (20–25° C.) for 20 hours. The reactor was then opened and the contents poured into water. The lower organic layer which formed was separated and distilled resulting in 32.4 g. of 2-(hexafluoroisopropoxy) pentafluoro - cyclobutene - 1 of the formula

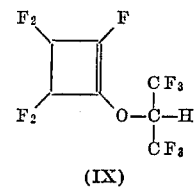

Its boiling point was 81° C. Elemental analysis showed. Calc.: C, 27.11; H, 0.33. Found: C, 27.29; H, 0.32.

Infrared spectrogram indicated no isomer was present.

EXAMPLE 4

The perfluorocycloalkene monofluoroethyl ether mixture of Example 1 and the compounds of Example 2 were tested as fumigants against termites and these compounds, as well as that of Example 3, were tested against various so-called "stored product" insects by placing 10 insects of each species in 1.5 inch diameter salve tins with perforated lids. The tins containing the termites were placed in a gallon jar and covered with three pints of soil. The soil was seeded with radish seeds to observe the effect of the toxicant on germination. Then 0.1 cubic centimeter of the toxicant was placed on top of the soil and the jar was closed. The tins containing the insects (or their larvae) were provided with an appropriate amount of food and were placed in one gallon jars. Then 0.1 cubic centimeter of toxicant in a small open container or on a cellucotton wad (equivalent to about one pound of toxicant per 1,000 cubic feed of space) was placed in each jar. Other tests were made with smaller dosages, i.e., 8 ounces of the toxicant in gallon jars. Similar jars were prepared with similar charges of insects but no toxicants. Exposure to the toxicant was maintained for 24 hours, after which the organisms were removed from the jars and observed for percent mortality after three days, with results shown in Table I below:

TABLE I

| Compound | Dosage, lbs. per 1,000 cu. ft. | Days After 24-Hour Exposure | | | | |
|---|---|---|---|---|---|---|
| | | 0 | 3 | 3 | 3 | 3 |
| | | Percent Dead | | | | |
| | | TM | CFB | LMW | BCB | YMW |
| Mixture of 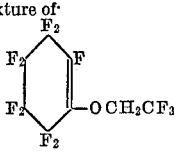 63% and 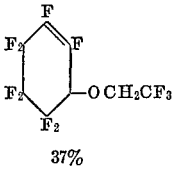 37% | 1.0 | 80 | 100 | 100 | 100 | (¹) |
| | 0.5 | (¹) | 100 | 100 | 100 | 40 |
|  | 1.0 | 100 | 100 | 100 | 100 | (¹) |
| | 0.5 | (¹) | 100 | 100 | 100 | 100 |
| 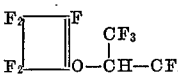 | 1.0 | (¹) | 100 | 100 | (¹) | 100 |

¹ Not tested.
NOTE.—TM=Termites; CFB=Confused flour beetle adults; LMW=Lesser meal worm adults; BCB=Black carpet beetle larvae; YMW=Yellow meal worm larvae.

Examination of the radish seeds in the toxicant treated termite infested soils showed 90% germination in both cases, indicating no significant phytotoxicity in the tested fumigants.

EXAMPLE 5

The individual isomeric trifluoroethoxynonafluorocyclohexenes of Example 1, i.e. compounds I and II, were tested as fumigants against termites and stored product insects in the same manner as described under Example 4 above, and were also tested against housefly pupae (*Musca domestica*) in the manner described above for the treatment of termites. Results are shown in Table II below:

While the above described the preferred embodiments of our invention, it will be understood that departures can be made therefrom within the scope of the specification and claims.

We claim:
1. The process for combating noxious insects which comprises contacting said insects with an insecticidally effective amount of the vapor of a perfluorocycloalkene-fluoromethyl ether of the formulas

(I) 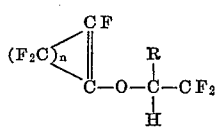

TABLE II

| Compound | Dosage, per 1,000 cu. ft. | 5 Days After 16-Hour Exposure | | | | | |
|---|---|---|---|---|---|---|---|
| | | Percent Dead | | | | | |
| | | TM | HF | CFB | BCB | SGB | YMW |
| 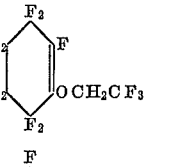 | 1 lb | 100 | 100 | 100 | 100 | 100 | 100 |
| | 8 oz | 100 | 100 | 80 | 100 | 100 | 60 |
| 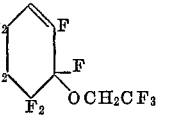 | 1 lb | 100 | 100 | 100 | 100 | 100 | 40 |
| | 6 oz | 89 | 100 | 80 | 80 | 100 | 0 |

NOTE.—TM=Termites; HF=Housefly pupae; CFB=Confused flour beetle adults; BCB=Black carpet beetle larvae; SCB=Sawtooth grain beetle adults; YMW=Yellow meal worm larvae.

or (II) 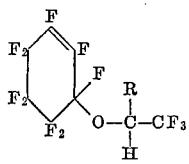

wherein R is a member selected from the group consisting of hydrogen and trifluoromethyl, and $n$ is 2 or 4.

2. The process of claim 1 wherein the formula is I, R is hydrogen and $n$ is 4.

3. The process of claim 1 wherein the formula is I, R is hydrogen and $n$ is 2.

4. The process of claim 1 wherein the formula is I, R is trifluoromethyl and $n$ is 2.

5. The process of claim 1 wherein the formula is

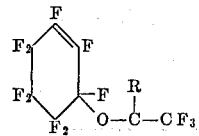

wherein R is hydrogen.

6. The process of claim 1 wherein the insects are termites.

7. The process of claim 1 wherein the insects are grain infesting insects.

References Cited

Chemical Abstracts 61: 2351d (1964).

Chemical Abstracts, Formula Index, vol. 64, Jan.–June 1966, p. 160(F).

ALBERT T. MEYERS, Primary Examiner

J. T. GOLDBERG, Assistant Examiner

UNITED STATES PATENT OFFICE
CERTIFICATE OF CORRECTION

Patent No. 3,470,302          Dated September 30, 1969

Inventor(s) Robert E.A. Dear and Everett E. Gilbert

It is certified that error appears in the above-identified patent and that said Letters Patent are hereby corrected as shown below:

Column 1, last formula, that portion of the formula reading

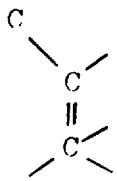        should read        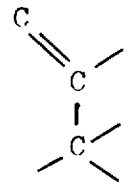

Column 5, Table I, second formula, that portion of the formula reading

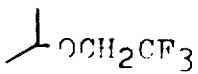        should read        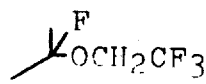

Column 6, Claim 1, formula (I), that portion of the formula reading $-CF_2$        should read        $-CF_3$ Column 8, Claim 5, in the formula, that portion of the formula reading

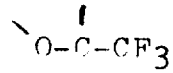        should read        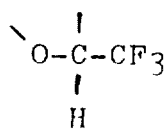

SIGNED AND
SEALED
MAY 19 1970

(SEAL)
Attest:

Edward M. Fletcher, Jr.
Attesting Officer

WILLIAM E. SCHUYLER, JR.
Commissioner of Patents